C. GOHR.
BENCH DOG.
APPLICATION FILED MAY 8, 1920.
1,355,140.
Patented Oct. 12, 1920.
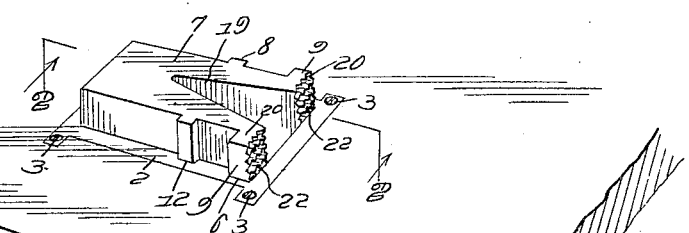
Fig. 1.
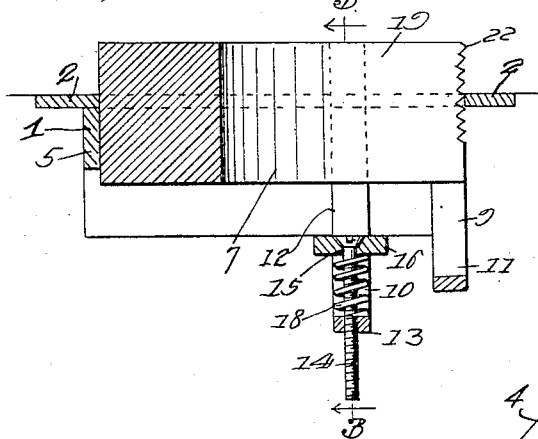
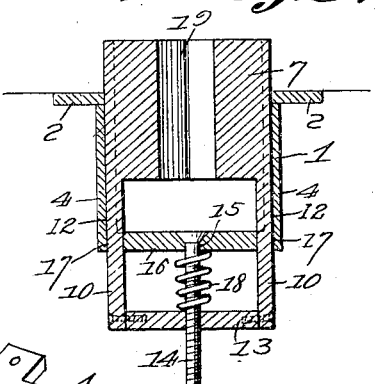
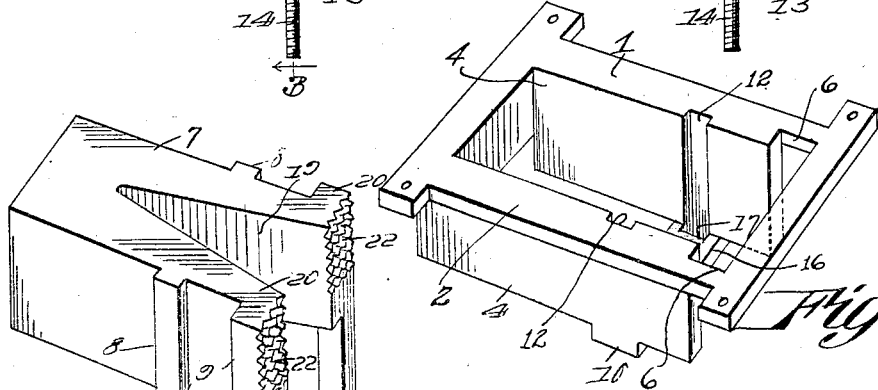
Inventor
Carl Gohr,
By Watson E. Coleman
Attorney

UNITED STATES PATENT OFFICE.

CARL GOHR, OF SCHUYLER, NEBRASKA.

BENCH-DOG.

1,355,140.  Specification of Letters Patent.  Patented Oct. 12, 1920.

Application filed May 8, 1920. Serial No. 379,841.

*To all whom it may concern:*

Be it known that I, CARL GOHR, a citizen of the United States, residing at Schuyler, in the county of Colfax and State of Nebraska, have invented certain new and useful Improvements in Bench-Dogs, of which the following is a specification, reference being had to the accompanying drawings.

This invention relates to an improved work bench dog or stop and an object is to provide a device of this kind which is very simple, efficient and practical in construction capable of being manufactured very cheaply and sold at a reasonable profit.

Another object is the provision of a bench dog wherein a metal frame is embedded in the work bench, and provided with guides for the reception of the bench dog proper for the purpose of guiding the dog in its vertical movement.

Still another object is to provide a device of this kind with the frame so embedded in the bench that a marginal portion thereof is embedded in the upper surface of the bench so that the upper surface of the marginal portion is flush with the upper surface of the bench, and wherein a single screw is so mounted in the frame and connected to the dog proper that when rotating the screw in one direction or the other the dog may be raised or lowered.

A further object embodies the provision of yieldable means on the screw and cooperating with the frame and the dog proper to bear upon a cross piece of the lower part of the dog proper to assist in fitting it downward as the screw is adjusted, and when the screw is turned in a direction for raising the dog, the yieldable means will be put under tension thereby creating sufficient friction between the parts as to hold the screw from accidentally turning and holding the dog in its adjusted position.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in perspective of a work bench showing the improved bench dog as applied, Fig. 2 is a longitudinal sectional view on line 2—2 of Fig. 1, showing the detail construction of the bench dog appearing part in section and part in elevation, Fig. 3 is a transverse sectional view on line 3—3 of Fig. 2; and Fig. 4 is a detail view of the bench dog proper removed;

Fig. 5 is a detail perspective view of the frame 1.

Referring to the drawings 1 designates a metallic frame which is preferably rectangular and which is embedded in the top board of the work bench. This frame has a marginal flange portion 2 which is countersunk in the work bench top so that its upper surface is flush with the upper surface of the bench top. Suitable screws or the like 3 engage through the flange portion and into the bench in order to secure the frame and the flange portion in position.

The frame comprises the longitudinal side pieces 4, and an end piece 5. The flange portion of the longitudinal side pieces have notches or guides 6. The bench dog proper 7 is mounted in the frame and the longitudinal sides thereof are provided with guide ribs 8 and 9, which extend downwardly and merge into extensions 10 and 11. The guide ribs 8 are engaged in the guide grooves 12 of the adjacent faces of the longitudinal sides 4 of the frame. The guide ribs 9 engage and are guided in the notches or guides 6 of the flange portion 2. In fact the guide ribs 9 are adjacent the end edges of the side pieces 4 of the frame in order to further assist in preventing the dog from binding during its adjusting movement.

The extensions 10 of the guide ribs 8 have their lower ends connected by a cross piece 13, in which a screw 14 is threaded. This screw 14 passes through an opening 15 of a cross piece 16, which connects the lower edges of the sides 4 of the frame. The cross piece 16 is formed with guide openings 17 through which the extensions 10 also pass. Interposed between the cross pieces 16 and 13 and in surrounding relation to the screw 14 is a coil spring 18, which acts to tension upon the cross piece 13, to cause the same to feed downwardly when the screw is adjusted in order to move the dog downwardly and below the upper surface of the bench top. This spring bearing between the cross pieces acts to cause the threads of the screw to bind frictionally in the opening of the cross piece 13 thereby preventing the screw from accidentally rotating, thereby holding the screw in place.

The bench dog proper 7 is provided with a V-shaped recess or wood receiving opening 19 in which a piece of wood or board is adapted to wedge so as to hold the board in a vertical position when planing the edge thereof. The ends of the sides of the dog, that is, the ends of the side pieces 20, caused to be formed by the V-shaped recess are provided with teeth 22 which are engaged by a board or other piece, when lying flat on the bench top, hence preventing slipping of the board while it is being planed.

By simply adjusting the screw in one direction or the other, the bench dog proper may be raised or lowered and adjusted to any desired position. It will be noted that the idea of the bench dog proper being mounted in the frame and having the co-operative guides, the dog will effectively and practically resist and withstand all the strains.

The invention having been set forth, what is claimed as new and useful is:

1. In a bench dog, a frame countersunk in a bench top and having its upper part countersunk below the upper surface of the bench top, said frame being rectangular and having vertical guides in the sides of said frame, a bench dog proper guided in said frame, said dog proper having its sides provided with vertical guide ribs engaging the guides of the sides of the frame, the ribs of the dog having extensions, a cross piece connecting said extensions, a cross piece connecting the sides of the frame, and means mounted in the second cross piece and being operatively connected to the first cross piece for raising and lowering said guide, and spring means interposed between the two cross pieces, to feed the dog downwardly as said means is adjusted.

2. In a bench dog, a frame countersunk in a bench top and having its upper part countersunk below the upper surface of the bench top, said frame being rectangular and having vertical guides in the sides of said frame, a bench dog proper guided in said frame, said dog proper having its sides provided with vertical guide ribs engaging the guides of the sides of the frame, the ribs of the dog having extensions, a cross piece connecting said extensions, a cross piece connecting the sides of the frame, and means mounted in the second cross piece and being operatively connected to the first cross piece for raising and lowering said guide, and spring means interposed between the two cross pieces, to feed the dog downwardly as said means is adjusted, said frame having a marginal flange portion, guides in said flange portion adjacent the ends of the side pieces of the frame, said dog having additional ribs engaging the guides of the flange portion and slidably engaging the end edges of the side pieces of the frame to insure guiding the dog to avoid binding when the dog is adjusted.

In testimony whereof I hereunto affix my signature.

CARL GOHR.